March 26, 1963 W. BUYER 3,082,445
DOUBLE RELEASE FOR THREADING DIE
Filed Feb. 8, 1960 2 Sheets-Sheet 1

INVENTOR.
WALTER BUYER
BY J. N. Douglas
his atty.

March 26, 1963 W. BUYER 3,082,445
DOUBLE RELEASE FOR THREADING DIE
Filed Feb. 8, 1960 2 Sheets-Sheet 2
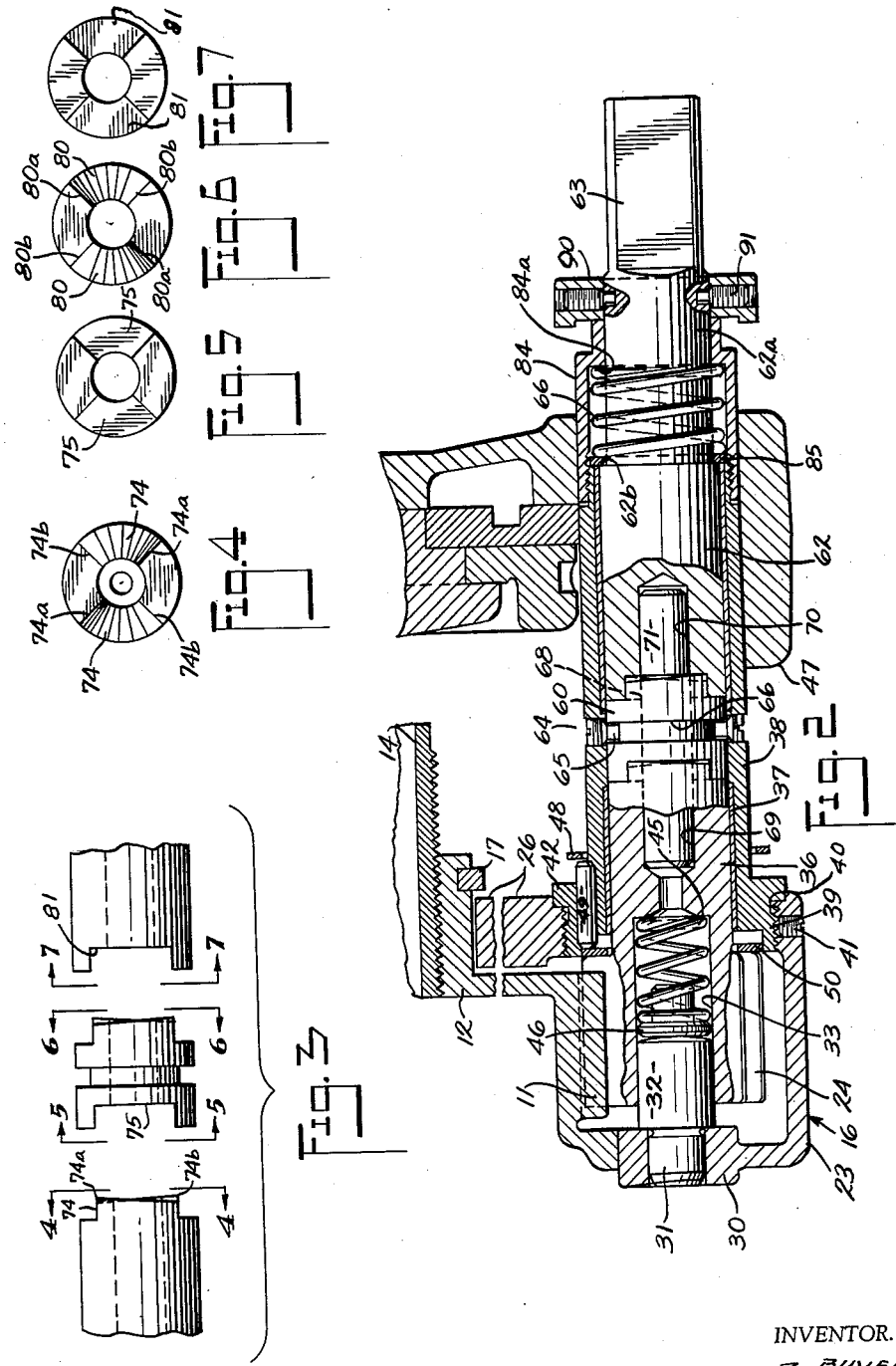
INVENTOR.
WALTER BUYER
BY
J. W. Douglass
His atty

3,082,445
DOUBLE RELEASE FOR THREADING DIE
Walter Buyer, North Olmsted, Ohio, assignor to The Ridge Tool Company, Elyria, Ohio, a corporation of Ohio
Filed Feb. 8, 1960, Ser. No. 7,309
4 Claims. (Cl. 10—105)

This invention relates to thread cutting devices and more particularly to a heavy duty threading die, which is adapted to be driven by a power drive and wherein means is provided to interrupt the power transmission upon completion of a threading operation. It is an improvement over that shown in the Patent No. 2,923,951 of February 9, 1960 and Patent No. 2,753,575 of July 10, 1956.

Heretofore it has been common practice to provide a threading die wherein there is provided a base that is clamped onto the pipe to be threaded and acts as a work holder. The base has a threaded opening and a barrel is threaded into the opening which barrel supports the thread cutting chasers. The barrel with its chasers is rotated, relative to the base, by a driven pinion which engages a ring gear. This causes the barrel to be drawn into the work holder with the thread cutting chasers, cutting a thread on the pipe.

Normally a certain amount or number of threads are cut on the pipe and then the thread cutting operation is stopped, the power drive reversed, and the chasers backed off the cut threads.

In order to enable the same number of threads to be cut each time a pipe is threaded, it has been proposed to provide a drive release, to interrupt the transmission of power from the pinion gear to the ring gear after a predetermined number of threads have been cut. This automatically provides uniformity as to the number of threads, releases the workman for other duties, and removes the guesswork on just when to stop the threading operation.

Although the above-mentioned patents successfully performed the above operations, there was another operation which had to be performed and which required the full attention of the operator, namely, the backing off operation.

By the present invention the operation of performing the thread cutting and the operation of backing off the chasers may each be performed automatically. To this end, the machine once started to cutting the threads, cuts a predetermined amount of threads and then the operation stops. At this time the power drive is still operating but a clicking sound is heard which calls the attention of the operator to the fact that the threading is completed. He then reverses the power source and the chasers are backed off. When the backing off operation is completed the power transmission is again interrupted and the clicking sound is again heard, notifying the workman that the die is now ready to be removed from the pipe.

In both of the above instances the interruption in the transmission of power prevents damage to the die, which is a precision instrument, by preventing the parts from being advanced or retracted too far. This prevents jambing of the parts, breaking of the parts, and eliminates possible injury to the workman or equipment due to the apparatus running too long in either direction.

Still other advantages of the invention, and the invention itself, will become more apparent from the following description of an embodiment thereof, which description is illustrated by the accompanying drawings and forms a part of this specification.

In the drawings:

FIG. 2 is an enlarged detailed sectional view of the improved drive release mechanism;

FIG. 3 is a fragmentary exploded view of certain of the parts which do the clutching; and FIG. 4 to 7 inclusive, are views taken from the lines 4—4; 5—5; 6—6 and 7—7 of FIG. 3.

Throughout the drawings like parts have been designated by like reference characters.

Figure 1:
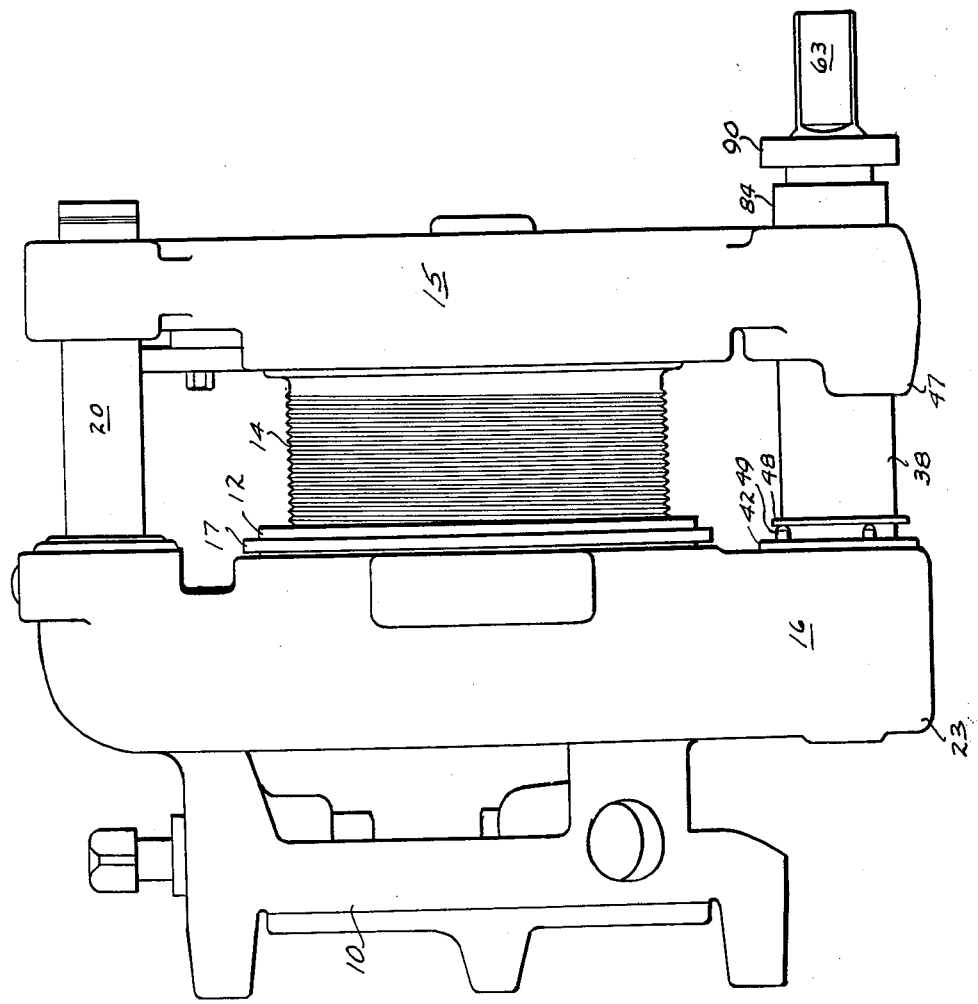
FIG. 1 is an elevational view of a threading die embodying the invention.

As best shown in FIG. 1, the threading die includes a work holder 10 having the usual work gripping members and which carries a ring gear 11. The work holder has a coaxial internally threaded flange 12 for accepting a threaded barrel 14 on a chaser carrying die head 15.

The flange 12 also provides a support for a ring gear housing 16 which is rotatably mounted on the flange 12, being held in place thereon by a lock ring 17, said housing surrounding the ring gear. The barrel, the housing and the die head partake of a revolving movement relative to the work holder by virtue of a driven pinion which is carried by the housing and is in mesh with the ring gear. The revolving movement causes the barrel to be threaded into the work holder carrying with it the die head and chasers which chase the threads on the pipe.

At one side the housing 16 supports a post 20 which extends slidably through the die head. The post partakes of a dual function in that it carries the drive head about its orbit and also as the die head is advanced on the pipe, causes the chasers to be moved outward to cut a tapered thread.

Opposite the post 20 the ring gear housing 16 is formed with an enlargement 23 for housing and supporting the drive pinion 24. The housing is provided with an inwardly extending flange 26 which rides on the flange 12 being held in place, as stated, by the lock ring 17.

The pinion support includes a boss 30 which carries a stepped pin having a reduced end 31, which is a press fit in the boss 30, and an enlarged part 32 which extends into an axial bore 33 in the pinion 24. The pinion is rotatably and slidably journalled in a bearing 37 carried by a pinion shaft housing 38. The pinion shaft housing is provided with an enlarged threaded base 39 which is threaded in a threaded opening 40 in the housing 24 and held against movement by a set screw 41. A flange 42 on the base 39 seats in a counterbore around the threaded opening 40. The shaft housing extends slidably through an enlargement or boss on the die head. It thus, along with the post 20, helps to drive the die head.

It will be noted that the pinion 24 and its shaft 36 is movable longitudinally in the housing, but such movement is resisted by a spring 45 seated in the end bore 36 and carrying a pressure or wear plug 46 which engages the support pin 32.

Movement of the pinion and its shaft is effected when the part 47 on the die head which moves along the housing 38 while the threads are being cut, toward the workholder, engages a ring 48 loosely surrounding the housing 38 and pushes it against a plurality of pins 49, extending through the flange 42, and which in turn press a ring 50 disposed at the inner edge of the pinion gear. This pressure on the pinion and its shaft, is against that of the spring 45. In this respect the apparatus and operation thereof is similar to that of the first mentioned patent.

The pinion shaft 36 is driven by a coupling 60 which in turn is driven by a shaft 62 journalled in the housing 38 and having a square or polygonal end 63 for engagement with a suitable power drive, or, when no power is available, may be rotated by a suitable wrench.

The coupling 60 is rotatably journalled in the housing 38 but is held against longitudinal movement by a plurality of screws 64 which are threaded into the housing and have reduced extensions 65 which extend into a groove 66 in the mid portion of the coupling.

As best seen from FIG. 2, the coupling 60 is provided with an axial bore 68. The pinion shaft 36 is likewise provided with a bore 69 and the drive shaft 62 with a bore 70, all of which are in axial alignment with each other and receive a centering pin 71 which holds the parts in positive alignment with each other.

The end of the pinion shaft 36 is provided with a pair of tongues which engage in recesses in the coupling. The tongues 74 on the pinion shaft are in the shape of segments and are diametrically opposite to each other. The end faces of the segments slant from one end to the other circumferentially in the direction of rotation of the shaft when the threads are being chased, the high points being indicated at 74a and the low points at 74b. The recesses 75 in the coupling have the same segmental shape as the tongues 74 but the bottom does not slant, since the shape of the bottom is unimportant to the operation.

It will be seen that as the coupling is driven in a clockwise direction that the pressure is from the sides of the recess against the low sides 74b of the segments on the couplings. As the drive continues and eventually the boss 47 on the die head hits the ring 48 which pushes the pins 49 to in turn push the ring 50 to the left, the pinion is gradually moved to the left against the pressure of the spring 45 until finally the side of the recess slips over the low edge 74b of the tongues and rides up on the slanting face passing over the high side with a click.

The pinion is no longer driven and the die head stops. The coupling and its drive shaft continue to rotate however, making a clicking sound, which calls the attention of the operator to the fact that the thread cutting has been completed. This in addition to the fact that he can see that the die head has stopped revolving.

The operator then reverses the power drive to rotate the shaft 62 counter clockwise. The wall of the coupling recess then drives against the high side 74a of the tongues 74 which immediately starts to drive the pinion gear in the opposite direction which rotates the die head in the opposite direction and moves the die outwardly on the barrel.

The other end of the coupling is provided with a pair of segmental tongues 80 which engage in complementary recesses 81 in the end of the drive shaft. The faces on the segments 80 slant in the opposite direction to the tongues 74, the high spot being at 80a and the low spot at 80b. The connection between the coupling and the drive shaft 62 is thus similar to that between the pinion and the coupling.

The drive shaft 62 is provided with a reduced portion 62a which extends through a cap 84 that is threaded onto the end of the housing 38. The junction of the reduced part 62a with the body provides a shoulder 62b against which a thrust ring 85 is placed. Between the end 84a of the cap and the thrust ring is a spring 86. The pressure of the spring between the end of the cap and shoulder causes the drive shaft to be moved to the left toward the coupling 60 and to maintain a driving engagement therebetween.

Secured to the shaft at the end of the cap is a ring 90, the ring being held to the shaft by set screws 91.

As the power drive has been reversed, the die holder moves outwardly and eventually the boss 47 engages with the ring 90. This moves the drive shaft 62 outward against the pressure of the spring 66 until such a time as the edge of the recess, which is driving against the low side 80a of the tongues on the coupling, disengages from the drive and the tongues ride up on the parts defining the sides of the recess in exactly the same manner as described for the tongues and recess between the coupling and pinion shaft, but in the opposite direction.

The drive then ceases and the operator is apprised of the same by the clicking sound and shuts off the power drive.

It will thus be seen that the movement of the die head relative to the work holder is only between predetermined limits. This prevents the unit from becoming jambed or broken and also prevents it from becoming unscrewed and falling apart.

This enables a cheaper threading device to be made for it eliminates the need of extra parts for holding the same against falling apart when it is being backed off.

It also saves the time of the workman, because he does not have to stand by it and watch it. He merely starts it, reverses it and then shuts the motor off. Each step in the operation is culminated by an aural signal. Thus he is free to devote his time to other activities.

Having thus described the invention in an embodiment thereof it is appreciated that numerous and extensive departures may be made therefrom without departing from the spirit or scope of the invention as defined by the appended claims.

I claim:

1. A thread cutting apparatus including a workholder for engagement with work to be threaded, a chaser carrying head attached to the workholder and movable rotatably and longitudinally relative to the workholder for cutting threads on the work, a driven gear carried by the workholder and a drive pinion carried by the chaser carrying head for causing relative movement between the two, the improvement thereon which comprises a housing connected with the head, said pinion having a shaft slidably and rotatably mounted in the housing, a coupling rotatably mounted in the housing and means for holding said coupling against longitudinal movement, spring means for said pinion and shaft for moving the shaft toward the coupling, a second shaft rotatably and slidably mounted in said housing on the other side of said coupling and spring means for moving said shaft toward said coupling, and separate means connected to each of said shafts and extending exteriorly of said housing, said head having a portion slidably surrounding said housing and arranged to engage said separate means alternately for moving said shafts from engagement with the coupling.

2. An apparatus as described in claim 1 wherein the pinion shaft, the second shaft and said coupling are provided with tongues and grooves whereby the pinion shaft is arranged for releasable engagement with the end of the coupling and the second shaft is arranged for releasable engagement with the other end of the coupling.

3. A threading apparatus including a workholder adapted to be attached to a work piece to be threaded, said workholder furnishing a support for a thread cutting chaser holder which is threaded in the workholder whereby it may be rotated and moved longitudinally for cutting threads on the work piece, a first housing rotatably supported on the workholder and housing a ring gear carried by the workholder, a pinion and drive shaft housing carried by said first housing, the improvement which comprises a pinion and shaft, said pinion being in driving engagement with the ring gear and said shaft being slidably mounted in said drive shaft housing, a coupling disposed in the drive shaft housing opposite the end of the pinion shaft supported for rotational movement and held against longitudinal movement, spring means connected between the first housing and pinion for biasing the shaft toward the coupling, said shaft having segmental end portions facing toward the coupling and said coupling having segmental recesses for receiving said end portions, the faces of each of said end portions being inclined away from the coupling circumferentially in the direction of rotation of the shaft when a threading operation is being performed, a second driven shaft disposed in said housing on the opposite side of said coupling for rotational and longitudinal movement thereon, spring means in engagement with the housing and said shaft for biasing said second shaft toward the coupling, said second shaft having segmental recesses on the end facing the coupling and said coupling having segmental projections for engagement in said recesses, the faces of said projections on the coupling being inclined circumferentially away from the shaft in the direction of rotation of the shaft when the shaft is being driven to remove the chasers from thread cutting engagement with the work piece after the thread cutting operation.

4. An apparatus as described in claim 3, wherein release means is provided mounted exteriorly on the pinion shaft housing and connected to said pinion and the shaft and means carried by said chaser carrying head is disposed adjacent said release means for engagement therewith upon one extreme movement of the chaser head toward the workholder to release said shaft from engagement with said coupling, and means is provided connected to said second shaft and is engageable by said chaser carrying means at the extreme movement of the chaser head away from the workholder to release said second shaft from engagement with said coupling.

References Cited in the file of this patent

UNITED STATES PATENTS

| 2,923,951 | Beavis | Feb. 9, 1960 |
| 2,940,093 | Pealer | June 14, 1960 |

FOREIGN PATENTS

| 552,485 | Great Britain | Apr. 9, 1943 |